(12) United States Patent
Cooper

(10) Patent No.: US 11,587,154 B2
(45) Date of Patent: Feb. 21, 2023

(54) PRODUCT-BASED TREES FOR ONLINE STORE

(71) Applicant: KwikClick, LLC, Murray, UT (US)

(72) Inventor: Fred Cooper, Farmington, UT (US)

(73) Assignee: KWIKCLICK, LLC, Murray, UT (US)

( * ) Notice: Subject to any disclaimer, the term of this patent is extended or adjusted under 35 U.S.C. 154(b) by 0 days.

(21) Appl. No.: 17/372,116

(22) Filed: Jul. 9, 2021

(65) Prior Publication Data
US 2022/0012799 A1    Jan. 13, 2022

Related U.S. Application Data

(60) Provisional application No. 63/049,877, filed on Jul. 9, 2020.

(51) Int. Cl.
*G06Q 30/00* (2012.01)
*G06Q 30/0601* (2023.01)
(Continued)

(52) U.S. Cl.
CPC ..... *G06Q 30/0641* (2013.01); *G06F 16/9558* (2019.01); *G06Q 30/0214* (2013.01)

(58) Field of Classification Search
None
See application file for complete search history.

(56) References Cited

U.S. PATENT DOCUMENTS 6,029,141 A    2/2000  Bezos et al.
6,105,001 A *  8/2000  Masi ............... G06Q 20/02
                                              705/14.1

(Continued)

FOREIGN PATENT DOCUMENTS

AR    122027       8/2022
EP    3 780 553    2/2021
(Continued)

OTHER PUBLICATIONS

• Lindsay Kramer. How to Start an MLM Company. (Nov. 05, 2019). Retrieved online Nov. 4, 2021. https://bizfluent.com/how-6245111-start-mlm-company.html (Year: 2019).*
(Continued)

*Primary Examiner* — James A Reagan
(74) *Attorney, Agent, or Firm* — Polsinelli LLP

(57) ABSTRACT

The present disclosure is directed to a system and method to allow sellers of products to establish individual products in a multilevel marketing (MLM) commission system, where the product is offered and sold to a first purchaser—who then actively by requesting a code, or passively, through the purchase of the product, becomes a user of the commission system. This user is provided a code such that the code may be passed onto followers of the registered user, either directly or via a referral hyperlink. The registered user will be allowed to advertise the product to a second purchaser and the second purchaser will be allowed to purchase the product and provide advertisements to other purchasers. Commissions paid to respective downline purchasers for a single product may be limited by a preset number of defined levels. After a product is purchased, commissions are paid out to each respective purchaser according to the defined commission levels. Purchase of the product may be facilitated by an online store controlled by the system. Products may be automatically added to the online store. The referral hyperlink may be directed to the online store or to the default landing page provided by the third party vendor of the product.

18 Claims, 7 Drawing Sheets

(51) Int. Cl.
*G06F 16/955* (2019.01)
*G06Q 30/0214* (2023.01)

(56) References Cited

U.S. PATENT DOCUMENTS

| | | | |
|---|---|---|---|
| 6,334,111 B1* | 12/2001 | Carrott | G06Q 30/02 |
| | | | 705/14.39 |
| 6,691,093 B2 | 2/2004 | Shell | |
| 7,359,871 B1 | 4/2008 | Paasche et al. | |
| 7,584,118 B1 | 9/2009 | Bellare et al. | |
| 7,668,950 B2 | 2/2010 | Horowitz et al. | |
| 7,917,402 B2 | 3/2011 | Rolf et al. | |
| 8,412,629 B2 | 4/2013 | Masi | |
| 8,571,944 B2 | 10/2013 | Frascino | |
| RE45,006 E | 7/2014 | Deaton et al. | |
| 8,996,415 B2 | 3/2015 | Rollins et al. | |
| 9,043,228 B1 | 5/2015 | Ross et al. | |
| 9,466,075 B2 | 10/2016 | Carlson et al. | |
| 9,923,927 B1* | 3/2018 | McClintock | H04L 63/0846 |
| 10,726,472 B2 | 7/2020 | Isaacson et al. | |
| 11,017,420 B2 | 5/2021 | Aihara et al. | |
| 11,282,101 B2 | 3/2022 | Cooper | |
| 2001/0032145 A1 | 10/2001 | Cronin | |
| 2002/0198779 A1 | 12/2002 | Rowen et al. | |
| 2003/0204447 A1 | 10/2003 | Dalzell et al. | |
| 2004/0010452 A1 | 1/2004 | LaCour | |
| 2004/0093269 A1* | 5/2004 | Rubin | G06Q 30/0211 |
| | | | 705/14.19 |
| 2004/0103022 A1 | 5/2004 | Chilcoat et al. | |
| 2004/0107267 A1 | 6/2004 | Donker et al. | |
| 2005/0004837 A1* | 1/2005 | Sweeney | G06Q 30/02 |
| | | | 705/14.16 |
| 2006/0047547 A1 | 3/2006 | Ekker et al. | |
| 2006/0063515 A1 | 3/2006 | Alston | |
| 2006/0235764 A1 | 10/2006 | Bamborough et al. | |
| 2007/0219871 A1* | 9/2007 | Rolf | G06Q 30/0241 |
| | | | 705/14.4 |
| 2008/0033744 A1 | 2/2008 | Jones | |
| 2008/0041938 A1 | 2/2008 | Wise | |
| 2008/0077485 A1* | 3/2008 | Scrudato | G06Q 30/0214 |
| | | | 705/14.16 |
| 2008/0162304 A1 | 7/2008 | Ourega | |
| 2008/0221992 A1 | 9/2008 | Bernstein | |
| 2008/0221994 A1 | 9/2008 | Rutz et al. | |
| 2008/0228595 A1 | 9/2008 | Hill et al. | |
| 2009/0182637 A1 | 7/2009 | Roberts | |
| 2009/0216645 A1 | 8/2009 | Oleen | |
| 2009/0259547 A1 | 10/2009 | Clopp | |
| 2009/0276305 A1 | 11/2009 | Clopp | |
| 2009/0287555 A1 | 11/2009 | Faraee | |
| 2010/0191550 A1 | 7/2010 | Hutson | |
| 2010/0205051 A1 | 8/2010 | Yun | |
| 2011/0047012 A1 | 2/2011 | Sherman | |
| 2011/0099082 A1 | 4/2011 | Walker et al. | |
| 2011/0137815 A1 | 6/2011 | Barnett et al. | |
| 2011/0153740 A1 | 6/2011 | Smith et al. | |
| 2011/0208572 A1 | 8/2011 | Ladd et al. | |
| 2011/0231363 A1 | 9/2011 | Rathod | |
| 2011/0288970 A1 | 11/2011 | Kidron et al. | |
| 2011/0307478 A1* | 12/2011 | Pinckney | G06F 16/9537 |
| | | | 707/724 |
| 2012/0010940 A1* | 1/2012 | Masi | G07G 1/14 |
| | | | 705/14.39 |
| 2012/0089454 A1* | 4/2012 | Chen | G06Q 30/0201 |
| | | | 705/14.42 |
| 2012/0150598 A1* | 6/2012 | Griggs | G06Q 30/0214 |
| | | | 705/14.16 |
| 2012/0158552 A1 | 6/2012 | Smith | |
| 2012/0209722 A1 | 8/2012 | Plut | |
| 2012/0245976 A1 | 9/2012 | Kumar et al. | |
| 2012/0253986 A1 | 10/2012 | Chang | |
| 2012/0310738 A1* | 12/2012 | Mesaros | G06Q 50/01 |
| | | | 705/14.57 |
| 2013/0013420 A1 | 1/2013 | Bamborough et al. | |
| 2013/0013439 A1 | 1/2013 | Smullen et al. | |
| 2013/0041735 A1 | 2/2013 | Johnson et al. | |
| 2013/0041781 A1* | 2/2013 | Freydberg | G06Q 30/06 |
| | | | 705/27.1 |
| 2013/0110599 A1 | 5/2013 | Gonzales | |
| 2013/0204672 A1* | 8/2013 | Campbell | G06Q 10/06393 |
| | | | 705/7.39 |
| 2013/0211891 A1 | 8/2013 | Daniel et al. | |
| 2013/0231986 A1* | 9/2013 | Masi | G06Q 30/06 |
| | | | 705/14.13 |
| 2013/0282455 A1 | 10/2013 | Houseworth et al. | |
| 2013/0290172 A1 | 10/2013 | Mashinsky | |
| 2013/0304585 A1* | 11/2013 | Atazky | G06Q 30/0214 |
| | | | 705/14.66 |
| 2014/0029921 A1 | 1/2014 | Warren et al. | |
| 2014/0067677 A1 | 3/2014 | Ali et al. | |
| 2014/0195316 A1 | 7/2014 | Vorotyntsev et al. | |
| 2014/0344294 A1 | 11/2014 | Skeen et al. | |
| 2014/0358665 A1 | 12/2014 | Gopalsamy et al. | |
| 2014/0365350 A1 | 12/2014 | Shvarts | |
| 2015/0019309 A1* | 1/2015 | Miskell | G06Q 30/0214 |
| | | | 705/14.16 |
| 2015/0066689 A1 | 3/2015 | Astore | |
| 2015/0106185 A1 | 4/2015 | Cervenka et al. | |
| 2015/0127438 A1 | 5/2015 | Wedderbum et al. | |
| 2015/0170103 A1 | 6/2015 | Garg et al. | |
| 2015/0199772 A1 | 7/2015 | Sherman | |
| 2015/0206165 A1 | 7/2015 | Cummins et al. | |
| 2015/0227972 A1 | 8/2015 | Tang | |
| 2015/0302486 A1* | 10/2015 | Foufas | G06Q 30/0273 |
| | | | 705/14.25 |
| 2015/0341225 A1 | 11/2015 | Baarman et al. | |
| 2016/0034936 A1 | 2/2016 | Bryant et al. | |
| 2016/0034938 A1 | 2/2016 | Brown et al. | |
| 2016/0092967 A1 | 3/2016 | Akbarpour et al. | |
| 2016/0125443 A1 | 5/2016 | Merritt, Jr. | |
| 2017/0024767 A1 | 1/2017 | Johnson et al. | |
| 2017/0032450 A1 | 2/2017 | Jia et al. | |
| 2017/0109771 A1 | 4/2017 | Sundman et al. | |
| 2017/0109772 A1 | 4/2017 | Sundman et al. | |
| 2018/0033062 A1* | 2/2018 | Taylor | G06Q 50/01 |
| 2018/0039993 A1 | 2/2018 | Rossi et al. | |
| 2018/0040014 A1* | 2/2018 | Collomby | G06Q 30/0229 |
| 2018/0053224 A1 | 2/2018 | McClave et al. | |
| 2018/0075488 A1 | 3/2018 | Celik et al. | |
| 2018/0096316 A1* | 4/2018 | Mendez | G06Q 20/0855 |
| 2018/0189799 A1* | 7/2018 | Passantino | G06F 9/505 |
| 2018/0276698 A1* | 9/2018 | Bryant, III | G06Q 50/01 |
| 2018/0293601 A1 | 10/2018 | Glazier | |
| 2018/0293603 A1 | 10/2018 | Glazier et al. | |
| 2018/0341945 A1* | 11/2018 | Welborn | G06Q 30/0226 |
| 2018/0367629 A1 | 12/2018 | Slosar et al. | |
| 2019/0005527 A1 | 1/2019 | Bryant et al. | |
| 2019/0362438 A1* | 11/2019 | MacLaughlin | G06Q 10/10 |
| 2019/0370676 A1* | 12/2019 | Pinckney | G06Q 30/02 |
| 2020/0143407 A1 | 5/2020 | Postrel | |
| 2020/0302464 A1 | 9/2020 | Suru | |
| 2020/0364734 A1 | 11/2020 | Glazier et al. | |
| 2021/0037008 A1 | 2/2021 | Swaminath et al. | |
| 2021/0090154 A1 | 3/2021 | Michaelson et al. | |
| 2021/0118033 A1 | 4/2021 | Coker et al. | |
| 2021/0133160 A1 | 5/2021 | Craft | |
| 2021/0350399 A1 | 11/2021 | Cooper | |
| 2021/0350453 A1 | 11/2021 | Cooper | |
| 2021/0374784 A1 | 12/2021 | Cooper | |
| 2021/0374787 A1 | 12/2021 | Cooper | |
| 2021/0374813 A1 | 12/2021 | Cooper | |
| 2022/0012762 A1 | 1/2022 | Cooper | |
| 2022/0027936 A1 | 1/2022 | Cooper | |
| 2022/0027937 A1 | 1/2022 | Cooper | |
| 2022/0027938 A1 | 1/2022 | Cooper | |
| 2022/0027939 A1 | 1/2022 | Cooper | |
| 2022/0027940 A1 | 1/2022 | Cooper | |
| 2022/0027971 A1 | 1/2022 | Cooper | |
| 2022/0253800 A1 | 8/2022 | Cooper | |
| 2022/0253881 A1 | 8/2022 | Cooper | |
| 2022/0253882 A1 | 8/2022 | Cooper | |
| 2022/0253889 A1 | 8/2022 | Cooper | |
| 2022/0261835 A1 | 8/2022 | Cooper | |

(56) References Cited

U.S. PATENT DOCUMENTS

| | | | |
|---|---|---|---|
| 2022/0261848 A1 | 8/2022 | Cooper |
| 2022/0327570 A1 | 10/2022 | Cooper |
| 2022/0358467 A1 | 11/2022 | Cooper |
| 2022/0366469 A1 | 11/2022 | Cooper |
| 2022/0391936 A1 | 12/2022 | Cooper |
| 2022/0398618 A1 | 12/2022 | Cooper |
| 2022/0398619 A1 | 12/2022 | Cooper |
| 2022/0398622 A1 | 12/2022 | Cooper |
| 2022/0405793 A1 | 12/2022 | Cooper |

FOREIGN PATENT DOCUMENTS

| | | | | |
|---|---|---|---|---|
| JP | 2013084209 A | * | 5/2013 | |
| KR | 20070106337 A | * | 11/2007 | |
| KR | 20120109772 A | * | 10/2012 | |
| TW | 202147200 | | 12/2021 | |
| TW | 202201316 | | 1/2022 | |
| TW | 202207121 | | 2/2022 | |
| TW | 202209222 | | 3/2022 | |
| WO | WO 2021/226374 | | 11/2002 | |
| WO | WO 2008/019711 | | 2/2008 | |
| WO | WO-2008019711 A1 | * | 2/2008 | ............ G06Q 30/00 |
| WO | WO 2008/143373 | | 11/2008 | |
| WO | WO 2013/020325 | | 2/2013 | |
| WO | WO 2014/102927 | | 7/2014 | |
| WO | WO 2014/194419 | | 12/2014 | |
| WO | WO 2015/171450 | | 12/2014 | |
| WO | WO 2019/204670 | | 10/2019 | |
| WO | WO 2020/012200 | | 1/2020 | |
| WO | WO 2021/226375 | | 11/2021 | |
| WO | WO 2021/243153 | | 12/2021 | |
| WO | WO 2021/243154 | | 12/2021 | |
| WO | WO 2021/243159 | | 12/2021 | |
| WO | WO 2022/011289 | | 1/2022 | |
| WO | WO 2022/011293 | | 1/2022 | |
| WO | WO 2022/011296 | | 1/2022 | |
| WO | WO 2022/011299 | | 1/2022 | |
| WO | WO 2022/011300 | | 1/2022 | |
| WO | WO 2022/011301 | | 1/2022 | |
| WO | WO 2022/011302 | | 1/2022 | |
| WO | WO 2022/011304 | | 1/2022 | |
| WO | WO 2022/165207 | | 8/2022 | |
| WO | WO 2022/165314 | | 8/2022 | |
| WO | WO 2022/165389 | | 8/2022 | |
| WO | WO 2022/204589 | | 9/2022 | |
| WO | WO 2022/204601 | | 9/2022 | |

OTHER PUBLICATIONS

• Kevin Geary. How to Make Money With Affiliate Marketing (Jun. 5, 2018). Retrieved online Nov. 4, 2021. https://digitalambition.co/affiliate-marketing/ (Year: 2018).*
Edelman, Shimon; "Computing the Mind—How the Mind Really Works", Oxford University Press, Copyright 2008, 55 pages.
Goffman, Erving; "Frame Analysis" Northeastern University Press, 1974, 55 pages.
Grier, David A.; "When Computers Were Humang", Princeton University Press, copyright 2005, 36 pages.
Hayles, N. Katherine; "My Mother Was a Computer", The University of Chicago Press, Copyright 2005, 49 pages.
Kuhn, Thomas S.; "The Structure of Scientific Revolutions", The University of Chicago Press, Copyright 1962, Third Edition, 122 pages.
Lakoff, George and Johnson, Mark; "Metaphors We Live By", The University of Chicago Press, Published 1980, 66 pages.
Mindell, David A.; "Our Robots, Ourselves: Robotics and the Myths of Autonomy". Copyright 2015, 16 pages.
Treffert, Darold; "Islands of Genius—The Bountiful Mind of the Autistic, Acquired, and Sudden Savant", by Jessica Kingsley Publishers, 2010, 20 pages.
Van Dam et al., Koen H; "Agent-Based Modelling of Socio-Technical Systems", Springer, vol. 9, 96 pages.
Wirth, Niklaus; "Algorithms + Data Structures = Programs", by Prentice-Hall, copyright 1976, 77 pages.
PCT Application No. PCT/US2021/034760 International Search Report and Written Opinion dated Sep. 10, 2021.
PCT Application No. PCT/US2021/034767 International Search Report and Written Opinion dated Sep. 1, 2021.
U.S. Appl. No. 17/313,795 Office Action dated Oct. 6, 2021.
PCT Application No. PCT/US2021/031149 International Search Report and Written Opinion dated Aug. 6, 2021.
PCT Application No. PCT/US2021/034759 International Search Report and Written Opinion dated Aug. 23, 2021.
PCT Application No. PCT/US2021/031150 International Search Report and Written Opinion dated Aug. 23, 2021.
U.S. Appl. No. 17/313,783 Office Action dated Jul. 15, 2021.
PCT Application No. PCT/US2021/041141 International Search Report and Written Opinion dated Oct. 27, 2021.
PCT Application No. PCT/US2021/041149 International Search Report and Written Opinion dated Nov. 23, 2021.
PCT Application No. PCT/US2021/041152 International Search Report and Written Opinion dated Oct. 27, 2021.
PCT Application No. PCT/US2021/041156 International Search Report and Written Opinion dated Oct. 21, 2021.
PCT Application No. PCT/US2021/041157 International Search Report and Written Opinion dated Nov. 5, 2021.
PCT Application No. PCT/US2021/041158 International Search Report and Written Opinion dated Oct. 19, 2021.
PCT Application No. PCT/US2021/041160 International Search Report and Written Opinion dated Oct. 19, 2021.
PCT Application No. PCT/US2021/041162 International Search Report and Written Opinion dated Oct. 20, 2021.
U.S. Appl. No. 17/313,783 Final Office Action dated Oct. 22, 2021.
U.S. Appl. No. 17/332,891 Office Action dated Dec. 13, 2021.
U.S. Appl. No. 17/825,963, Fred Cooper, A Method for Setting Up User Created Storefronts Within a Product Tree Based Multi-Level Marketing System, filed May 26, 2022.
U.S. Appl. No. 17/700,900, Fred Cooper, System for Commissions for Multilevel Marketing, filed Mar. 22, 2022.
PCT/US2022/041160, Single Line Tree Creation by a Distribution for a Product Based Multi, Jul. 9, 2021.
U.S. Appl. No. 17/826,973, Fred Coopper, A Method for Credit Card Integration Within a Product Tree Based Multi-Level Marketing System, filed May 26, 2022.
U.S. Appl. No. 17/825,980, Fred Cooper, Method for Banking Integration Within a Product Tree Based Multi-Level Marketing System, filed May 26, 2022.
U.S. Appl. No. 17/706,106, Fred Cooper, Smart Link for Outside Network Input/Output, filed Mar. 28, 2022.
PCT/US2022/022162, Smart Link for Outside Network Input/Output, Mar. 28, 2022.
U.S. Appl. No. 17/706,150, Fred Cooper, Permissions for Retailer Types Within a Marketing System, filed Mar. 28, 2022.
U.S. Appl. No. 17/706,406, Fred Cooper, Incorporating Additional Blockchains Into a Multi-Level Marketing System Blockchain, filed Mar. 28, 2022.
U.S. Appl. No. 17/733,705, Fred Coopper, Incorporating Additional Blockchains Into a Multi-Level Marketing System Blockchain, filed Apr. 29, 2022.
PCT/US2022/022208, Incorporating Additional Blockchains Into a Multi-Level Marketing System Blockchain, Mar. 28, 2022.
U.S. Appl. No. 17/863,192, Fred Cooper, System and Method for Merging a Two or More Multi-Level Marketing System Into a Multi-Line Multi-Level Marketing System and Integrating a Product Tree MLM, filed Jul. 12, 2022.
Chmela, John; Social Media is the best tool over for Multi-Level Marketing, LinkedIn.com, dated Apr. 3, 2015, downloaded Feb. 9, 2022 from https://www.linkedin.com/pulse/social-media-best-tool-ever-multi-level-marketing-john-chmela (Year: 2015).
Doeing, Derek; What is Network Marketing? (+6 Business Questions to Ask Before Joining), G2.com, dated Jul. 26, 2018, downloaded from https://web.archive.org/web/20200503212907/https://learn.g2.com/network-marketing (Year: 2018).

(56) References Cited

OTHER PUBLICATIONS

Stephenson, Ben; "What are the Best Types of Products to Market in MLM?" Published Feb. 24, 2016 at https://www.linkedin.com/pulse/what-best-types-products-market-mlm-ben-stephenson.
PCT Application No. PCT/US2022/014354 International Search Report and Written Opinion dated May 3, 2022.
PCT Application No. PCT/US2022/014521 International Search Report and Written Opinion dated May 13, 2022.
PCT Application No. PCT/US2022/014638 International Search Report and Written Opinion dated Apr. 25, 2022.
PCT Application No. PCT/US2022/022162 International Search Report and Written Opinion dated Jun. 28, 2022.
U.S. Appl. No. 17/332,916 Office Action dated Feb. 17, 2022.
U.S. Appl. No. 17/332,891 Final Office Action dated Jun. 29, 2022.
U.S. Appl. No. 17/332,940 Office Action dated Apr. 15, 2022.
U.S. Appl. No. 17/313,795 Final Office Action dated Jan. 27, 2022.
U.S. Appl. No. 17/588,811 Office Action dated Aug. 12, 2022.
U.S. Appl. No. 17/372,134 Office Action dated Mar. 2, 2022.
U.S. Appl. No. 17/372,135 Office Action dated Apr. 11, 2022.
U.S. Appl. No. 17/372,139 Office Action dated Apr. 12, 2022.
U.S. Appl. No. 17/372,174 Office Action dated Aug. 18, 2022.
U.S. Appl. No. 17/372,198 Office Action dated Feb. 17, 2022.
Google.com search results for "franchise definition" (Year: 2022) [Downloaded on Sep. 22, 2022].
PCT Application No. PCT/US2022/022208 International Search Report and Written Opinion dated Oct. 6, 2022.
U.S. Appl. No. 17/588,811 Office Action dated Jun. 30, 2022.
U.S. Appl. No. 17/589,821 Office Action dated Sep. 28, 2022.
Trauzold, Martin; "How To Add an Amazon Affiliate Link to My Website", 2016.
PCT Application No. PCT/US2021/031149 International Preliminary Report on Patentability dated Nov. 8, 2022.
PCT Application No. PCT/US2021/031150 International Preliminary Report on Patentability dated Nov. 8, 2022.
PCT Application No. PCT/US2021/034759 International Preliminary Report on Patentability dated Nov. 17, 2022.
PCT Application No. PCT/US2021/034760 International Preliminary Report on Patentability dated Nov. 17, 2022.
PCT Application No. PCT/US2021/034767 International Preliminary Report on Patentability dated Nov. 17, 2022.
U.S. Appl. No. 17/587,777 Office Action dated Nov. 21, 2022.
U.S. Appl. No. 17/332,891 Final Office Action dated Jan. 10, 2023.
U.S. Appl. No. 17/332,940 Final Office Action dated Oct. 17, 2022.
U.S. Appl. No. 17/372,134 Final Office Action dated Nov. 21, 2022.
U.S. Appl. No. 17/372,135 Final Office Action dated Jan. 5, 2023.
U.S. Appl. No. 17/372,139 Final Office Action dated Oct. 17, 2022.
U.S. Appl. No. 17/825,980 Office Action dated Nov. 2, 2022.
U.S. Appl. No. 17/372,198 Final Office Action dated Dec. 23, 2022.
U.S. Appl. No. 17/706,483 Office Action dated Nov. 4, 2022.

\* cited by examiner

PRODUCT-BASED TREES FOR ONLINE STORE

CROSS-REFERENCE TO RELATED APPLICATION

The present application claims the priority benefit of U.S. provisional application No. 63/049,877 filed Jul. 9, 2020, the disclosure of which is incorporated herein by reference.

BACKGROUND OF THE INVENTION

Field of Invention

The present disclosure is generally related to multi-level commission payment systems and methods. More specifically the present disclosure is directed to providing commissions, referral, and/or finder fees to purchases made by related users.

Description of the Related Art

A Multilevel marketing (MLM) commission payment system is a sales methodology used by some direct sales companies, which may be used to encourage existing distributors to recruit new distributors who are paid a percentage of their recruits' sales. The recruits are "downline" of the distributors. Distributors also make money through direct sales of products to customers. Amway, which sells health, beauty, and home care products, is an example of a well-known direct sales company that uses multilevel marketing.

Multilevel marketing (MLM) has been found to be a legitimate business sales methodology if participants receive something of value for their participation in an MLM organization. Even though Amway has a pyramid like structure where sponsors may receive more benefits than new recruits, Amway been judged to be a legitimate organization because all participants receive the benefit of purchasing products at a competitive price. One problem with some MLM organizations referred to as "pyramid schemes" is in instances where new recruits do not receive any benefit based on just joining the MLM organization. One characteristic of an MLM "pyramid scheme" versus a legitimate MLM organization is that in a "pyramid scheme" participants receive benefits based primarily from signing up other new recruits. Thus, money received from the new recruits only pays people above them or at the top of the organization rather than new recruits or others who actually perform work (e.g., the selling of products). As such, a "pyramid scheme" is also characterized by paying sponsors rather than individuals that perform the work. This is why "pyramid schemes" are illegal. These "pyramid schemes" involve taking advantage of people by pretending to be engaged in legitimate multilevel or network marketing activities when their greater focus is on recruitment rather than on product sales.

One issue in determining the legitimacy of a multilevel marketing company is whether it sells its products primarily to consumers or to its members who must recruit new members to buy their products. If it is the former, the company is likely a legitimate multilevel marketer. If it is the latter, it could be an illegal pyramid scheme.

Each MLM company dictates its own specific financial compensation plan for the payout of any earnings to their respective Distributors. Compensation is exclusively in the form of commissions that require a participant to enter a contract, pledging exclusivity in participation to the MLM company paying the commissions. A new recruit by contract, is expressly prohibited from joining, recruiting for another MLM, and offering alternative goods or services from any other MLM Company.

MLM compensation plans theoretically pay out to participants only from two primary possible revenue streams. The first is paid out from commissions of sales made by the participants directly to their own retail customers. Retail customers are not tracked or known by the MLM company therefore MLM companies cannot substantiate either their existence or their sales volume individually or collectively. The second is paid out from commissions based upon the wholesale purchases made by other distributors below the participant who have recruited those other participants into the MLM; in the organizational hierarchy of MLMs, these participants are referred to as one's downline distributors.

MLM salespeople (distributors) are, therefore, expected to sell specific MLM company products directly to end-user retail consumers by means of relationship referrals and word of mouth marketing, but most importantly they are incentivized to recruit others to join the company's distribution chain as fellow salespeople so that these can become downline distributors.

Currently, no large financially successful MLM salesperson (distributor) can earn commissions of any significance or take full advantage of a commission compensation plan without personally recruiting others into their downline.

All MLM compensation companies permanently place new recruits in a tree structure for calculating commissions. Once placed, all sales made by that distributor from their personal purchases, or from new recruits they sponsor, generate commissions only for their sponsor and upline, regardless of all future products sold.

MLM companies offer goods or services offered specifically and exclusively by them. The large markups required for payment of commissions necessitate MLM companies to limit what products they can offer such that they will be financially indifferent regarding which product a distributor chooses to buy.

MLM companies currently require a "pay to play" requirement. Distributors are required to make monthly purchases, and/or meet downline group sales volumes to qualify for commissions. Thus, the mode, median and average purchase size of a Distributor in MLMs is virtually equal to this minimum qualification requirement and no greater.

Distributors only qualify for commissions if they have purchased a minimum threshold of products offered exclusively by the MLM company as set forth by an MLM company's commission program rules.

Currently, in order to join an MLM organization, there is an initiation fee, which may be a barrier against those that just wish to refer a single product offered by the MLM company. Current multi-level marketing (MLM) systems do not take full advantage of the internet and how consumers can influence other consumers to make purchases. Also, current MLM systems do not incorporate incentivizing users of a multilevel marketing system by offering a dynamic commission tree. In addition, there is no current MLM system that utilizes the money or funds dedicated to discounts or coupons to be reincorporated into a multilevel marketing system to incentive consumers to make purchases and advertise the product that they purchased.

Currently, a company that is not utilizing an MLM structure for paying commissions for sales, cannot introduce one without developing a compensation plan specific for their company, following the methodology outlined above, and thus requiring them to become and subsequently adhere to applicable MLM law.

Thus, there is a need to provide any company an opportunity to compensate consumers in the way of commissions, referral, and/or finder fees without being subject to MLM law.

Further, there is currently no systematic way for consumers to promote any brand of preference outside the MLM industry and be paid in an MLM commission methodology without subjecting themselves to a contractual signup, initiation fees, minimum recurring purchases sales volume requirements, recruiting, exclusivity and permanent tree placement (resulting in only upline Distributors earning commissions). Many MLMs do not allow direct buying from an online store, but instead require buying to occur through other members.

BRIEF DESCRIPTIONS OF THE DRAWINGS

Figure 7:
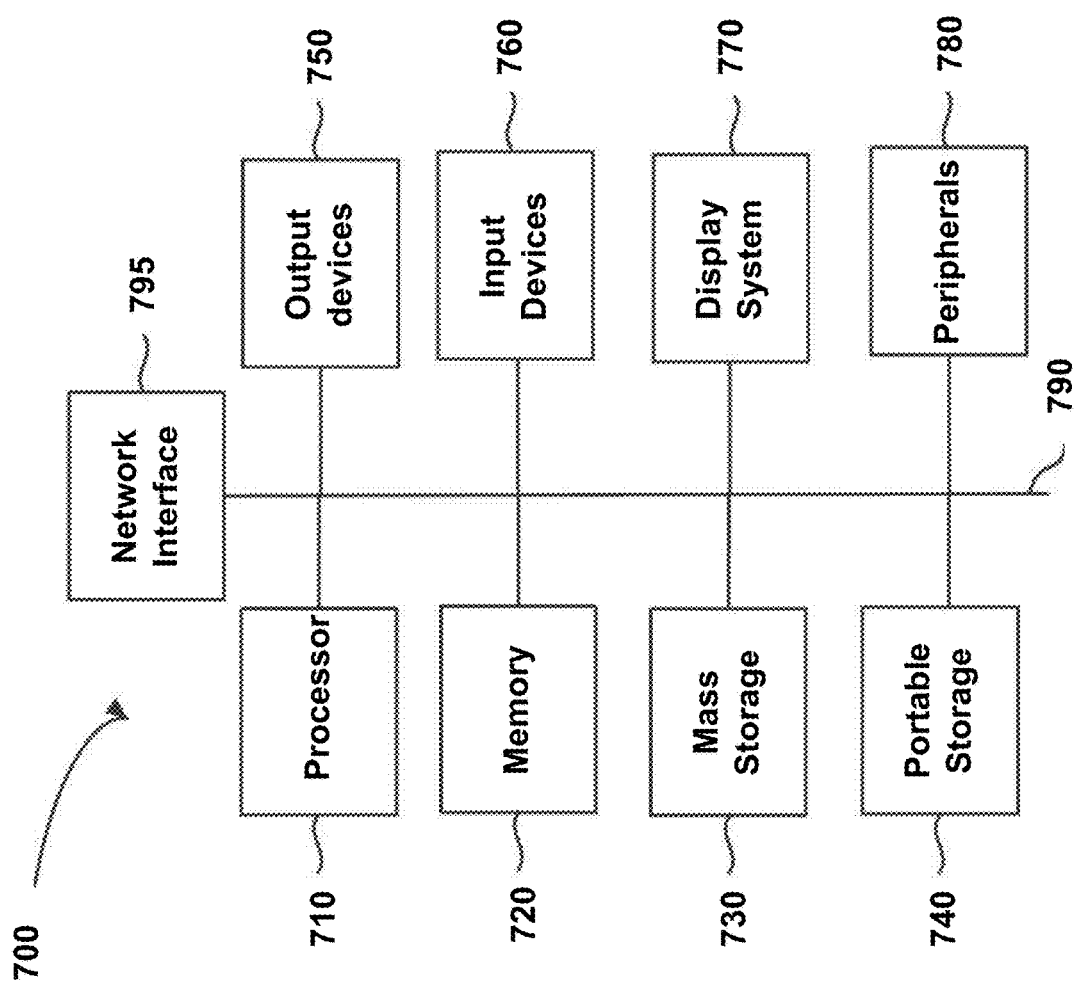

FIG. 7: Illustrates a computing system that may be used to implement an embodiment of the present invention.

SUMMARY OF THE CLAIMED INVENTION

A buyer purchases a product that is registered with an administration network. The buyer then automatically becomes a user (user A) of the administration network. The administration network generates a code (code A) that is associated with user A. The code is embedded in a hyperlink that links to a redirect page controlled by the administration network. The redirect page will then redirect the hyperlink with embedded code A to an online store. A second buyer is directed to the online store via the hyperlink and purchases the product from the online store. The second buyer also automatically becomes a user (user B) of the administration network. The user A is awarded commission because user B used the hyperlink containing code A. The administration network generates different code (code B) that is associated with user B and with code A. The code is embedded in a hyperlink that links to a redirect page controlled by the administration network. The redirect page will then redirect the hyperlink with embedded code B to the online store. A second buyer is directed to the online store via the hyperlink and purchases the product from the online store. The third buyer also automatically becomes a user (user C) of the administration network. Both user A and user B are awarded commission because use C used the hyperlink containing code B, which is associated with code A. The administration network generates different code (code C) that is associated with user C and code B.

Alternatively, a computer that is part of an administration network receives a notification that a buyer has purchased a registered product. The computer then identifies the buyer as a user (user A). The computer generates a code (code A) that is associated with user A. The computer embeds code A in a hyperlink which will link a web browser to a redirect page controlled by the computer. The computer causes the redirect page to redirect the web browser to an online store. When product is purchased from the online store the computer will receive a notification that includes the purchased product and code A. The computer receives a notification that another buyer has purchased the same product, and the notification includes code A. The computer then identifies the second buyer as a user (user B). The computer awards commission to user A because the notification included code A. The computer generates a different code (code B) that is associated with user B and code A. The computer embeds code B in a hyperlink which will link a web browser to a redirect page controlled by the computer. The computer causes the redirect page to redirect the web browser to the online store. When product is purchased from the online store the computer will receive a notification that includes the purchased product and code B. The computer receives a notification that another buyer has purchased the same product, and the notification includes code B. The computer then identifies the third buyer as a user (user C). The computer awards commission to both user A and user B because the notification included code B, which is associated with code A. The computer generates a different code (code C) that is associated with user C.

DETAILED DESCRIPTION

The present disclosure is directed to a system and method to allow sellers of products to enroll an individual product in a multilevel marketing (MLM) type commission system [system], where a good or service [product] is offered by any vendor and sold to a first purchaser—who at the time of the purchase becomes a system user. This user has a code tied to the specific product(s) offered by the participating vendor. The code is shared by this first user passively (by a purchase) or actively (by request) to the new buyer. The code share makes the new buyer a user of the system. The new user, like the first, will be allowed to purchase the product and provide advertisements to other purchasers. Commissions paid to respective downline purchasers for a single product may be limited by a preset number of defined levels. After a product is purchased, commissions are paid out to each respective purchaser according to the defined commission levels.

Figure 1:
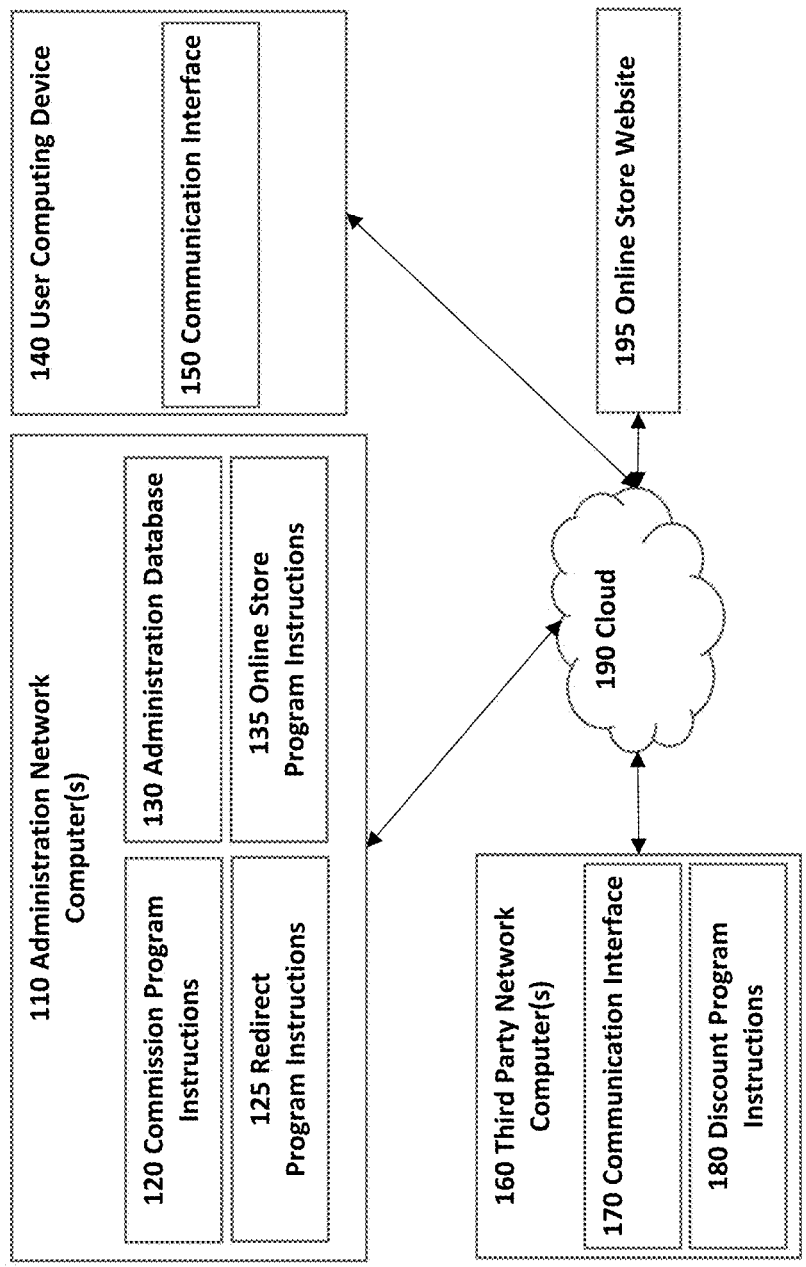
FIG. 1 illustrates a system for Multi-Level Marketing of products via a set of computing devices.

An administration network computer, as shown in FIG. 1, identifies that a product has been purchased from a user(s) of the system [first user]. The system may generate an embedded coded link that connects (links) the referrer to the purchaser(s). This link may be shared automatically or manually depending on the referrer's preference. The computer may then automatically pay remuneration, in the form of a commissions, referral, and/or finder fees, to the first user. Additionally, the purchaser(s) becomes a second user(s) of the system. Should a new individual buy the same product from the second user(s), another embedded coded link may connect the first user to not only the second user but the new individual(s) as well. Both the first and second user of the system are remunerated for the new individual(s) purchase. This wave of creating and recreating users (1, 2, 3, etc.) based on purchases and linking them together may be indefinitely iterative. Remuneration on this specific product may be paid to all users linked together in the system, each time a purchase is made. The links may be unique and are fixed to each good or service being referred.

FIG. 1 illustrates a system 100 for Multi-Level Marketing of products via a set of computing devices. The system of FIG. 1 includes an administration computer or "administration network" computer 110, a user computing device 140 (user device), and a third party network computer 160. Each of the devices of FIG. 1, the administration network computer 110, the third party network computer 160, and user device 140 may communicate with each other via the communications network 190 such as the Internet or a cloud.

Figure 5:
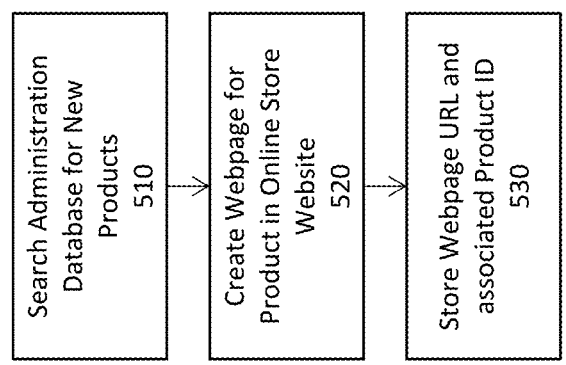
FIG. 5 illustrates a method that may be performed by the administration network computer 110 executing the set of online store program instructions 135 of FIG. 1.

A memory, as shown in FIG. 5, at the administration network computer 110 may store commission program instructions 120 executed by a computer processor, and an administration database 130. User device 140 of FIG. 1 may be any user device such as a laptop, smartphone, tablet, computer, or smart speaker which may include a user device communication interface 150 which may be a network interface as shown in FIG. 5. The third party network computer 160 of FIG. 1 may include discount program instructions 170 executed by a computer processor, a memory, and a communication interface 150 which may be a network interface.

Use of the system may be as follows. A user connects a user device 140 to the communication network 190 via the user device communication interface 150. Through the communication network 190 the user device 140 connects with the third party network computer 160 via the third party network communication interface 170. A set of third party network discount program instructions 180 allow the user to purchase a product from the third party network computer 160 and apply a discount to the product if a user has a code. Confirmation of the purchase and the code are then sent from the third party network computer 160 to the administration network computer 110. If the user did enter a code, a set of administration network commission program instructions 120 will pay commission to at least another user that is associated with the code. A new code is then generated by the administration network 110 per the administration network commission program instructions 120. The new code is associated with the user of the user device 140. The commission and the newly generated code are stored in the administration network administration database 130. The redirect program instructions 125 may be executed at the administration network computer 110 to redirect web browsing software from a redirect page to a landing page for the product associated with the generated code. The administration network computer may execute a set of online store program instructions 135 which may create a URL for a webpage associated with the product on the online store website 195. The redirect page may then instead redirect to the online store webpage associated with the product instead of the default landing page.

Program code instructions of the administration network computer 110 may be organized as one or more software modules that include instructions for performing different functions. For example, a set of commission program instructions 120 may include base program instructions, advertising program instructions, calculation program instructions, and vendor program instructions. the administration network computer 110 may also access one or more databases, such as a compensation database that stores compensation data and a code database that stores program code or web link data, for example. The administration network computer 110 may accept sellers (third parties), where a "single product tree" multi-level marketing method is formed, comprising the steps of, providing at least one product, providing an MLM system with a seller's commission structure, and providing at least one seller of a product with its associated commission structure. The term "single product tree" refers to a unique structure for associating distributors of an MLM organization where products are used to identify relationships between distributors and commissions paid to related distributors. This "single product tree" structure allows for a particular user to be considered a sponsor or any other user based on that user sending promotions to other users to purchase a product that those other users were not previously associated with.

The administration network computer 110 may also provide a plurality of buyers/distributors, allow the at least one first seller to enroll a product to the MLM system, and allow at least a first buyer/distributor to purchase the product. Other functions that may be performed by the administration network computer 110 include allowing the at least the first buyer/distributor to advertise the product to other potential buyers/distributors and allowing at least a second buyer/distributor to buy the advertised product. Here the seller may set a commission structure for a product, may enroll the product into the MLM system, may allow the first, second and so on purchasers/distributors to purchase and advertise the product.

Once products have been enrolled with a commission structure, the administration network computer 110 may allow the purchasers/distributors to receive a commission based upon the seller's product commission structure. A distributor may refer to the non-salaried workforce selling the company's products or services. Here the earnings of the participants may be derived from a pyramid-shaped or binary compensation commission system. The term product may refer to articles or substances manufactured or refined for sale. Product may refer to an individual product, a line of products such as unique brand and model of drill, or a group of products such as all power tools. A service may refer to a system supplying a public need such as transport, communications, or utilities such as electricity or water.

A service which may be an act of dealing with a customer in a store, restaurant, or hotel by taking their orders, showing, or selling them goods. Additionally, a service which may be work that someone does or time that someone spends working for an organization, or a business that offers a particular type of help or work. The system 100 of FIG. 1 may distribute commissions according to an MLM tree or commission tree that is a payment structure in which commissions are given out at different percentages at different levels of the MLM tree, for example. In such a system distributor (users) that perform the sale or that are at a level that is "closer" to the distributor that performed the sale may receive larger commissions than distributors that are "farther" from the sale.

In another example, a first MLM distributor that performs a sale may receive a higher percentage than a second distributor that sponsored the first distributor, and a third distributor that signed up the second distributor may receive a lower commission than the commission received by the second distributor for the sale. Distributors in an MLM tree may be referred as "downline" or "upline" distributors depending on where different users rank on the MLM tree. For example, a first user that sponsors a second user is "upline" from the second user and the second user is "downline" from the first user in the MLM tree. Furthermore, any user/distributor that the second user sponsored would be considered downline from the second user and could be downline from the first user as well for a given MLM product tree. When a "single product tree" structure is used to identify commissions, users that are downline from the second user may not be downline from the first user based on the second user purchasing and advertising products not associated with the first user. When the first user purchases the product initially advertised by the second user, the second user may be considered upline of the first user after the first user for this product. Because of this, the second user is not relegated to always be downline from the first user just because the first user originally sponsored the second user to become an MLM distributor.

An MLM system which may be referred to as network marketing, may be a business model that depends on person-to-person sales by independent representatives, who may work from their home. A network marketing business may require the independent representatives to build a network of business partners or salespeople to assist with lead generation and closing sales. End of life of MLM tree may refer to the end of the MLM tree in which the commission tree may be restructured or eliminated. For example, further participants in the MLM may not receive a commission, the commission tree may "startup" (be reinitiated from a starting point) again, or the commission tree may be restructured in some other way. An existing MLM system may refer to currently existing or established companies that use the sales strategies to encourage existing distributors to recruit new distributors who are paid a percentage of their recruits' sales.

The administration network computer 110 may perform data security functions as well as functions associated with operation of an MLM algorithm that may calculate user compensation. Administration network computer 110 may be able to connect to a software application store, like the "Apple App Store," where a program application can be downloaded from. Data security may refer to the process of protecting data from unauthorized access and data corruption throughout its lifecycle. Data security may include data encryption, tokenization, and key management practices that protect data across all applications and platforms. An MLM algorithm may refer to a calculation performed using a compensation decay rate to calculate the commissions for downline participants.

The commission program instructions 120 of FIG. 1 may cause a computer processor in the administration network computer 110 to continuously poll for user data (e.g., data of a user who may be a product purchaser or product distributor) from another processor executing a set of discount program instructions 180 at a third party network computer 160 or a notification of purchase from the online web store 195. Once the processor of the administration network computer 110 receives the user data, commissions may be calculated using the commission program instructions 120 of FIG. 1. These commissions may be calculated based on data stored in an administration network compensation database. Downline and upline commissions for the other users (product purchasers/distributors) within the MLM tree may be paid. The administration network compensation database may be included within the administration database 130 of FIG. 1 or it may be a separate database accessible by the administration network computer 110. Alternatively, instead of the administration network computer 110 polling a third party network computer 160, the third party network computer 10 may send the user data to the administration network computer 110 after a sale has been made.

An upline may refer to the MLM distributors that recruits work for as salespeople to sell the products or services. A downline may refer to the recruits the MLM distributors are able to secure as participants in the MLM system. Downline MLM trees may go across country boundaries and commissions may be paid out for an MLM tree even though the participants in the MLM tree may not reside in the same country. The commissions may be calculated for the appropriate exchange rate to ensure participants are paid in their residing countries currency in the correct amount.

A processor executing the commission program instructions 120 of FIG. 1 may continuously poll for user data from the third party network computer 160 or online web store 195. The administration network computer 110 may then receive the user data from the third party network computer 160 or online web store 195. Then the administration network computer 110 may determine whether the user entered a code or used a hyperlink with an embedded code. If the user did enter a code or used a hyperlink with an embedded code, the processor at the administration network computer 110 may extract the code and then access the administration network compensation database to identify one or more different spheres of influence or potential product purchasers/distributors levels. Such a code may have been received from user device 140 based on user inputs.

The processor at the administration network computer 110 may also associate a code for each of the different spheres of influence. The administration network computer 110 may then extract a corresponding commission for the code that was retrieved from in the administration network compensation database. The administration network computer 110 may then send the commission to the user (purchaser/distributor). The administration network computer 110 may track profits and payments as well as track taxes for users enrolled in the MLM system. The tracking of profits and payments may refer to the MLM system tracking the profits of the MLM and tracking the payments or commissions paid out to participants. The tracking of taxes may refer to tracking the commissions provided to participants for tax purposes. Then the administration network computer 110 may also compare the extracted code to data stored at an administration network code database a list of users and code sent to followers may be stored. This administration network code database may be the same database as the administration database 130 of FIG. 1 or it may be another database accessible by the administration network computer 110. The administration network computer 110 may extract a user ID and sphere of influence or potential purchaser/distributor by using the extracted code.

The administration network computer 110 may then compare the extracted sphere of influence or potential purchaser/distributor to data stored at the administration network compensation database. The administration network computer 110 may then use the extracted sphere of influence data to extract a corresponding commission from the administration network compensation database. The administration network computer 110 may then send the commission to an upline user. If the user did not enter a code, the administration network computer 110 may then initiate a set of administration network advertising program instructions.

The redirect program instructions 125 of FIG. 1 may cause a computer processor in the administration network computer 110 to poll for data from a redirect webpage controlled by the administration network computer 110. The administration network computer may then instruct the redirect webpage to redirect a web browser, or similar software, to a new URL. The new URL may be the product landing page provided by the third party vendor or an online store controlled by the administration network computer 110.

The administration database 130 may store data received from various third parties (various sellers) that are part of a set of MLM trees. This data may contain a product ID, description of the item, an original cost of the item, a discount for the item, a cost of the product with the discount, a compensation plan decay rate, and a link to the item. An advertising link may refer to a link that directs a consumer to a product, service or good.

TABLE 1

Administration Database Data

| third party | Home Depot | Home Depot | Furniture Store |
|---|---|---|---|
| ID | 654123 | 789654 | 123789 |
| Item | Drill | Table Saw | Couch |
| Original Cost | $59.00 | $tem119.00 | $999.00 |
| discount | 15% | 10% | 10% |
| discount Cost | $50.15 | $107.10 | $899.10 |
| Compensation Decay Rate | 50% | 50% | 30% |
| Link | HDDrill654123 | HDTSaw789654 | FSC123789 |

Table 1: Administration Database Data

Table 1 table displays data that may be stored at the administration database 130 of FIG. 1. When the administration network computer 110 receives product data from third party network computer 160 it creates a link for the item, stores the received data in the administration network administration database 130, and sends the created link back to the third party network computer 160. The administration network administration database 130 may be used to store data collected from various third parties that enrolled in the multi-level marketing system 100 of FIG. 1. The administration network administration database 130 may store the name of the third party, the ID for an item, a description of the item, the original cost of the item, the discount provided by the third party, the cost of the product with the discount, the compensation decay rate or how the downline commissions are calculated, and the link to the item.

The administration database 130 may store data that the administration network computer 110 may access when communicating events with the downlines and uplines, providing dynamic incentives or rewards for a product, distributing marketing materials, providing banking referrals, or distributing materials for suggestive selling, etc. Here, communicating events with downlines and uplines may refer to sending information relating to advertising events to participants of an MLM system. Dynamic incentives and rewards for a product may refer to incentives or rewards that are continuously updated for a product. Marketing materials may refer to a means of marketing, advertising or promotional materials developed by or for license (or subject to licensee's approval) that promote the sale of the licensed product, including but not limited to, television, radio and online advertising, point of sale materials (e.g., posters, counter-cards), packaging advertising, print media and all audio or video media. Banking referrals may refer to a structured flow of collecting and organizing referrals for banks. Businesses who have been unsuccessful in a credit application process with a bank may be asked for their permission to have their financial information passed to designated finance platforms who can contact the business in a regulated timeframe. Suggestive selling may refer to a sales technique where an employee asks a customer if they would like to include an additional purchase or recommends a product which might suit the client.

The online store program instructions 135 of FIG. 1 may cause a computer processor in the administration network computer 110 to determine which products from the admin database 130 should be hosted on the online store website 195. These products may then be stored in a separate database such as an online store database. These products may then be sold via the online store website 195.

As mentioned above user device 140 may include a memory, a processor, and a communication interface 150. The processor of user device 140 may execute instructions out of the memory when a user of user device 140 registers as a member of an MLM organization. Other tasks that a user may perform on user device 140 could include, identifying or connecting with other user devices (e.g., follower user devices), preparing advertisement information to share with follower user devices, receiving advertisement information prepared by other users, accessing product promotions at the third party network computer 160, and purchasing products based on offerings received from the third party network computer 160. Each of the tasks performed by user device 140 may include sending and receiving communications with the administration network computer 110, the third party network computer 160, or other user devices. Promotions prepared at a particular user device may be shared with other user device via administration network computer 110, third party network computer 160, a social media network computer, or directly from one user device to another. User devices may also be required to download and install an application program from an application store, such as the "Apple App store" as part of a process for registering as a member of an MLM organization.

The user device communication interface 150 of FIG. 1 may send and receive data via a communication network 190 which may be a wired and/or a wireless network.

As discussed above the third party network computer 160 of FIG. 1 may include a computer processor a memory, and communication interface 170. This third party network computer 160 may be controlled by various third parties, such as retail stores (stores that sell product consumables, services, franchises, service networks, large box stores) or e-commerce sites that allow e-commerce sales. Such e-commerce sites may include an e-commerce shopping cart, that offer items to users at a discount, such as a product discount, in order to use the MLM system of FIG. 1. A franchise may refer to an authorization granted by a government or company to an individual or group enabling them to carry out specified commercial activities, e.g., providing a broadcasting service, or acting as an agent for a company's products. Product consumables may refer to goods by individuals and businesses that must be replaced regularly because they wear out or are used up. Service networks refer to a collection of people and information brought together on the internet to provide a specific service or achieve a common business objective, such as Angie's List. E-commerce sale may refer to sales of goods and services where the business takes place over the internet, an extra-net, Electronic Data Interchange (EDI), or other online system.

Payment may or may not be made online. Business in this context may be defined as an order placed by the buyer or price and terms of sale negotiated. E-commerce shopping cart may refer to a software used in E-commerce to assist visitors to make purchases online. Upon checkout, the software calculates the total of the order, including shipping and handling, taxes and other parameters the owner of the site has previously set. Retailer may refer to a person or business that sells goods to the public in relatively small quantities for use or consumption rather than for resale. Product discounts may refer to a reduce price or something being sold at a price lower than that product is normally sold for. It is a reduction to a basic price for a good or service. Large box stores may refer to a physically large retail establishment, usually part of a chain of stores, offers a variety of products to its customers. The term sometimes refers, by extension, to the company that operates the store, and which may be referenced as a supercenter, superstore, megastore, etc. These stores achieve economies of scale by focusing on large sales volumes. Because volume is high, the profit margin for each product can be lowered, which results in very competitively priced goods. The term "big-box" is derived from the store's physical appearance.

The third party network communication interface 170 of FIG. 1 may send data and receive via a communication network 190 which may be a wired and/or a wireless network.

The third party network discount program instructions 180 of FIG. 1 may be executed by a computer processor after being initiated by a set of third party network base program instructions. These instructions may cause the processor at the third party network computer 160 to prompt user for a discount code and to compare a received code to data stored at a third party network third party database. When a code received from a user matches data stored at the databases, a discount for the selected product may be applied and an order for a product may be processed.

The communications network 190 of FIG. 1 may be the Internet or a cloud. This communication network or any of the communication network interfaces 150 or 170 discussed herein may be a wired and/or a wireless network. Such a communication network, if wireless, which may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet and relies on sharing of resources to achieve coherence and economies of scale, like a public utility, while third-party clouds enable organizations to focus on their core businesses instead of expending resources on computer infrastructure and maintenance.

The online store website 195 of FIG. 1 may be a set of related web pages located under a single domain name or URL. The online store website 195 may be accessible via the communications network 190. Connection to, and navigation within the online store website 195 may be facilitated by web browsing software, or similar software, on the user device 140. The online store website 195 may display products and details for those products. Users may order products directly from the online store website 195. If a user is directed to the online store website 195 by a hyperlink with an embedded code, the online store website 195 may extract that code. The extracted code may be automatically applied to any or all purchases the user makes through the online store website 195.

Figure 2:
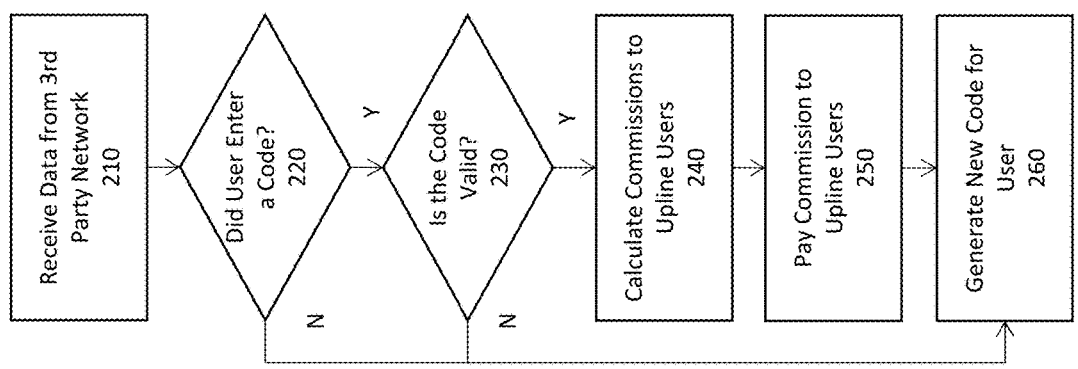
FIG. 2 illustrates a method that may be performed by a computer that performs functions consistent with the administration network computer 110 of FIG. 1.

FIG. 2 illustrates steps 200 that may be performed by a computer that performs functions consistent with the administration network computer 110 of FIG. 1. FIG. 2 begins at step 210 wherein the administration network computer 110 receives data from the third party network computer 160 of FIG. 1. The received data may contain information on a purchased product and the discount code applied to the purchase. This step may be facilitated by a set of administration network base program instructions stored in memory and executed by a processor. The administration network computer 110 may determine if the data received from the third party network computer 160 contains a code, at step 220. If the data does contain a code, the administration network computer 110 checks that both the product and code match data stored in the administration network administration database 130 and/or other databases and are recognized as valid, at step 230. If the code and product are valid, the computer at administration network computer 110 may calculate commissions due to each upline user, at step 230.

The commissions may be calculated by using the discount on the product and providing 50% of the discount to the user who supplied the code and then the remaining amount of the discount for the upline users at a 50% decay rate. For example, if the first user purchased a product that was originally $59.00 discounted by 15%, then a second user makes a purchase with the first user's code would receive $3.32 or 50% of the discount. Then any follower of the second user who uses the second user's code would cause the second user to receive 50% of the discount and the first user to receive 50% of the remaining discount or 50% of $3.32, and this may continue until there is only one cent left to pay out as a commission for the upline users. The threshold at which commission stops may be greater or less than one cent and may be set dynamically. This step may be facilitated by administration network calculation program instructions stored in memory and executed by a processor. Then, the administration network computer 110 may distribute the commission to the upline users, at step 250. Commission may be paid directly to a user via the user device 140 of FIG. 1. The data may be stored in a database, for example, an administration network compensation database discussed above. Whether or not a valid code was entered, the administration network computer 110 may generate a new code for the user such that the user can give the code to followers and receive commission on their purchases, at step 260 of FIG. 2. This generated code may be stored in the administration database 130 of FIG. 1 or another database, for example an administration network code database.

A set of administration network base program instructions may instruct the administration network computer 110 to connect to the third party network computer 160, initiate a set of vendor program instructions and initiate a set of calculation program instructions.

A set of administration network calculation program instructions which may be initiated by operation of the administration network base program instructions may instruct the administration network computer 110 to extract the discount received from the third party network computer 160 as well as the compensation plan or commission plan (e.g. its decay rate or commission structure so that each downline gets less and less commission) in order to identify the commissions for the MLM (Multi-Level Marketing) tree. Once identified, this commission data may be stored data in a database at the administration network computer 110 of FIG. 1. A commission may refer to a payment to someone who sells goods that is directly related to the amount sold, or a system that uses such payments. A compensation plan or a commission plan may refer to the decay rate of the commissions provided to the MLM system from the discount offered by the third party, the third party also selects the decay rate to calculate the commissions offered to the first purchaser as well as the percentage offered to the downline participants.

Functioning of the calculation program instructions may be as follows. The process may begin with operations of the administration network base program instructions initiating the administration network calculation program instructions. The administration network computer 110 may then extract the discount from the administration network administration database 130, which may be received from the third party network computer 160. Then the administration network computer 110 may extract the compensation plan decay rate from the administration network administration database 130. The administration network computer 110 may then determine the commissions available to the downline users, or the followers of the user that purchased the item.

The commissions may be calculated by using the discount on the product and providing 50% of the discount to the first participant and then the remaining amount of the discount for the downline users at a 50% decay rate. For example, if the first user purchased a product that was originally $59.00 discounted by 15%, the first user to make the purchase would receive $3.32 or 50% of the discount. Then any follower of the user who made the initial purchase would receive 50% of the remaining discount or 50% of $3.32, and this may continue until there is only one cent left to pay out as a commission for the downline users. Then the administration network computer 110 stores the data in the administration network compensation database. The administration network computer 110 sends a request to the user device purchase program instructions for the data stored in the user device user database. Then the administration network computer 110 may receive the user device user database data from the user device 140. The administration network computer 110 may store the received data, as well as the code data, in the administration network code database. The administration network computer 110 may then return to executing the administration network base program instructions.

A set of administration network advertising program instructions, which may be initiated by operation of the administration network commission program instructions 120, may determine the user's sphere of influence or contact list in order to provide the user's potential downline purchasers/distributors with a link and a code for the potential downline purchasers/distributors to become part of the MLM Tree Functioning of the advertising program instructions may be as follows. The process may begin with operation of the administration network commission program instructions 120 causing the administration network computer 110 to initiate the administration network advertising program instructions. The administration network computer 110 then determines if the user entered a code. If it is determined that the user entered a code the code is extracted. The administration network computer 110 compares the extracted code to the administration network compensation database.

The administration network computer 110 then may determine the user's sphere of influence level. If it is determined that the user did not enter a code, then the administration network computer 110 sets the user as the "First Participant". Then the administration network computer 110 extracts the code for the next sphere of influence level or potential purchaser/distributor to provide the user's followers with a code that would allow them to join the multi-level marketing tree. The administration network computer 110 then may send the code and the link to the product to the user device 140. A set of administration network vendor (those selling products) program instructions, which may be initiated by operation of the administration network base program instructions, may result in data being received from the third party network computer 160. The administration network computer 110 may then store the data in the administration network administration database 130, create a link for the item, send the link back to the third party network 160, and return to executing the administration network base program instructions.

Functioning of a set of vendor program instructions may be as follows. The process may begin with operation of the administration network base program instructions causing the administration network computer 110 to initiate the administration network vendor program instructions. The administration network computer 110 may then receive data from the third party network computer 160. This data may include a product to be enrolled in the MLM system, an original cost of the item, a discount provided by the third party, a cost of the product with the discount, a compensation plan decay rate, etc. Then the administration network computer 110 may create a link for the product for the third party network computer 160. A vendor may be a seller of a product, such as a retailer. The administration network computer 110 may then store the received data and the created link in the administration network administration database 130. The administration network computer 110 may then send the link to the third party network computer 160. The administration network computer 110 may then return to executing the administration network base program instructions.

An administration network compensation database, which may be created through operation of the administration network calculation program instructions, may store various commissions for the different product purchasers/distributors. Table 2 illustrates data that may be stored at a compensation database consistent with the present disclosure. The administration network computer 110 may extract discount information and a compensation plan decay rate to calculate the downline commissions for additional users. This discount, decay rate information, and the sphere of influence levels may be stored in the administration network compensation database discussed above. The administration network compensation database may store information that cross-references a third party, a product ID, product description, the compensation plan decay rate, the various sphere of influence levels, a commission for each sphere of influence level, and a code to be used by the user's followers to enroll in the MLM system 100 of FIG. 1. The administration network compensation database may store a lottery structure for how the commissions are paid to users or freelancers. This lottery structure may refer to a process or thing whose success or outcome is governed by chance. A means of raising money by selling number tickets and giving prizes to the holders of number drawn at random. Freelancers may refer to a person who works as a writer, designer, performer, or the like, selling work or services by the hour, day, job, etc., rather than working on a regular salary basis for one employer.

TABLE 2

Compensation Database Data

| third party | Home Depot | Home Depot | Home Depot |
|---|---|---|---|
| ID | 654123 | 654123 | 654123 |
| Item | Drill | Drill | Drill |
| compensation | 50% | 50% | 50% |
| Decay Rate | | | |
| Sphere of Influence Level | First Participant | 2 | 3 |
| Commission | $3.31 | $1.66 | $0.83 |
| Code | N/A | 654123-SOI2 | 654123-SOI3 |

Table 2: Compensation Database Data

Table 3 illustrates data that may be store at an administration network code database. This data may identify the codes given to the product purchasers/distributors (users) for the product purchasers/distributors (user) to pass to their potential purchasers/distributors to advertise or promote a product that a user has purchased. The administration network code may also cross-reference a user ID with a product ID, a product name, a sphere of influence (/potential purchaser/distributor), and a code that may be shared with followers.

TABLE 3

Code Database Data

| user ID | ID | Item | Sphere of Influence/ potential purchaser/distributor | code for Followers |
|---|---|---|---|---|
| JS1234 | 654123 | Drill | First Participant | 654123-SOI2 |
| HY8569 | 654123 | Drill | Second Participant | 654123-SOI3 |
| TB4567 | 789654 | Table Saw | First Participant | 897456-SOI2 |
| EL51346 | 789654 | Table Saw | Second Participant | 897456-SOI3 |

Table 3: Code Database Data

Figure 3:
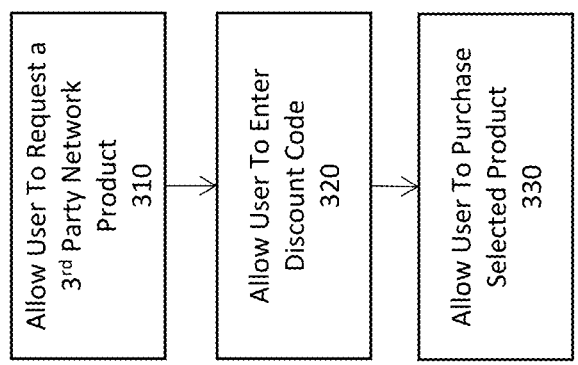
FIG. 3 illustrates a method that may be performed at a user device when operations of a multi-level-management system consistent with the present disclosure are performed.

FIG. 3 illustrates operations 300 that may be performed at a user device when operations of a multi-level marketing system 100 of FIG. 1 are performed. First the user device 140 may allow a user to request to purchase a product from the third party network computer 160, at step 310 of FIG. 3. This may involve directing the user to a web site or an online store. A link stored in the administration network administration database 130 may be used to automatically generate a request to purchase of a specific product. Then the user device 140 may then allow the user to enter a discount code, at step 320. The code may be entered automatically if the user selected a link received from the administration network computer 110. The user may enter the discount code in a graphical user interface (GUI) element such as a text box or input box, either via a native application on the user device 140 or directly via the third party network computer 160 (for example, via a web browser). The user device 140 may then allow the user to finalize an order, at step 330. This step may involve the transfer of payment information from the user device 140 to the third party network computer 160. Any or all these steps may be facilitated by user device communication interface 150, user device purchase program instructions stored in memory and executed by a processor, or a user device user database stored in memory.

A set of instructions referred to as user device purchase program instructions may allow a user device to connect to the third party network computer 160, allow a purchaser/distributor to select a product and an associated link. This process may include, determining if the purchaser/distributor entered a code, and sending the link and code, if available, to the third party network computer 160.

A set of instructions referred to as purchase program instructions may cause the user device 140 to continuously poll for a request from the administration network computer 110 for user device user database data. The user device 140 may then receive a request from the administration network computer 110 for the user device user database data. Then the user device 140 may send the user device user database data to the administration network computer 110. The user device 140 may then connect to the third party network computer 160. Then the user may select a product from the third party network computer 160. The user may select a link from the third party network computer 160. Then the user device 140 if the user entered a code. If it is determined the user entered a code the user device 140 sends the code to the third party network computer 160. The user device 140 sends the user data to the third party network computer 160. The user data may be data to purchase the product such as name, address, billing information, etc. The user data sent to the third party network computer 160 may include information from a credit card system. A credit card system may refer to a system that allows cardholders to borrow funds with which to pay for goods and services with the condition that the cardholders pay back the borrowed funds, plus interest, as well as any additional agreed-upon charges.

A user device user database which may contain the user's (product purchasers/distributors) followers (sphere of influence) as well as the followers contact information for them to receive commissions on their purchases. A distributor contact list or followers may refer to the recruits or followers on social media that a distributor has secured to participate in their downline. The user device user database may include ratings and recommendations from the users. Rating and recommendation modules may refer to modules in which a company, entity, or person provides ratings and/or recommendations for products, goods, or services.

Table 4 displays data that may be stored at a user device user database. The data of table 4 cross-references user information with user follower information. The user device user database stores the user's ID, the followers user ID, codes provided to the followers, the follower's e-mail address, the follower's phone number, and the follower's address. The user device user database may store the follower's social media information such as user social media account information (Twitter, Instagram, Facebook, etc.). The user database may contain social media plug-ins for enhanced marketing or social media aggregators. Social media plug ins for enhanced marketing may refer to sharing content with other people through social media platforms, for example a share or like button. The user device user database may contain payment information such as bank accounts, credit card information, PayPal, Venmo, etc. A user ID or ID Enrollment may refer to a participant enrolling in an MLM product tree through an ID, which may be unique to each participant in the MLM system. Social media aggregators may refer to a tool that allows a person to collate posts and updates from many different social media feeds. It creates an organized view of social posts on a specific topic and are often used to display user-generated content on live social walls.

TABLE 4

User Database Data

| user ID | JS1234 | JS1234 | JS1234 |
|---|---|---|---|
| Follower ID code for | HY8569 | IT8527 | RW4569 |
| Followers | 654123-SOI2 | 654123-SOI2 | 654123-SOI2 |
| Follower E-mail | HY8569@gmail.com | IT8527@yahoo.com | RW4569@gmail.com |
| Follower Phone | 781-654-8972 | 231-456-7891 | 654-987-3217 |
| Follower Address | 123 Main Street, Boston, MA | 58 Elm Street, Burlington, VT | 96 2nd Ave, Salt Lake City, UT |

Table 4: User Database Data

Operation of user device downline program instructions may cause the user device 140 to continuously poll to receive the code and link from the administration network computer 110 to allow the purchaser/distributor to pass the code and link to the user's followers stored in the user device user database. Functioning of the downline program instructions may be as follows. The process begins with the user device 140 continuously polling for the code and the link from the administration network computer 110. The user device 140 receives the code and the link from the administration network computer 110. The user device 140 provides a selection of the first follower in the user device user database. The user device 140 extracts the followers contact information stored in the user device user database. Then the user device 140 sends the code and link to the follower's contact information. The code and link may be shared on social media sites, such as Twitter, Instagram, Facebook, etc. This may allow the user's followers to receive the code and link based on communications that use one or more of these social media accounts. The user device 140 may then determine if there are more followers remaining in the user device user database. If it is determined that there are more followers stored in the user device user database, the user device 140 selects the next user stored in the user device user database. If the user device 140 determines that there are no more followers remaining in the user device user database, then the process ends.

Figure 4:
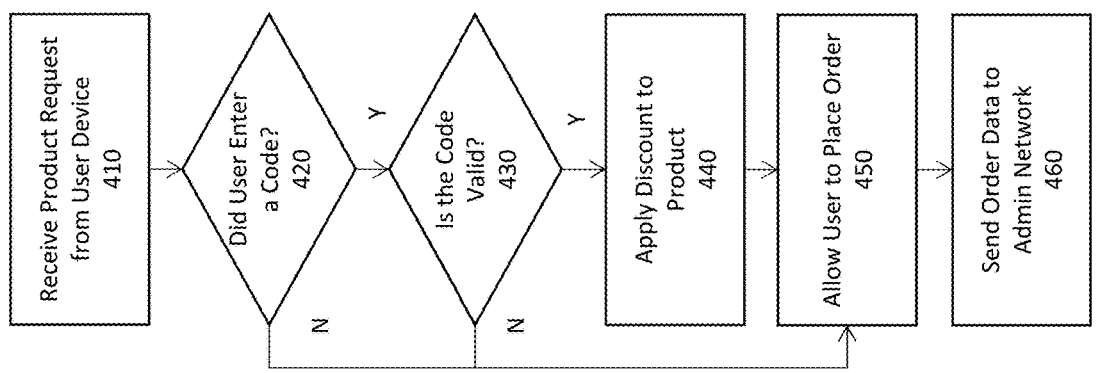
FIG. 4 illustrates a method that may be performed by a computer at the third party network computer 160 of FIG. 1.

FIG. 4 illustrates steps 400 that may be performed by a computer at the third party network computer 160 of FIG. 1. FIG. 4 begins with step 410 wherein the third party network computer 160 receives a request from a user device 140 to purchase a product. This request may be facilitated by a public facing webpage, for example, an online store page for the third party retailer that controls the third party network computer 160. The third party network computer 160 then may identify if the user entered a code, at step 420. Here, the code may be entered prior to a request for purchase. For example, before checking out using an online shopping cart the user may be able to enter discount codes. If a code was entered, the third party network computer 160 may identify whether the code is recognized as a valid code for receiving a discount, at step 430 of FIG. 4.

The code may be retrieved from the administration network computer 110 via the third party network communication interface 170. Codes may be stored locally on the third party network computer 160 or in a third party network third party database accessible by the third party network computer. If the code is valid, the third party network computer 160 applies a discount to the item, at step 440. An amount associated with this discount may be retrieved by the administration network computer 110 via the third party network communication network interface 170. Discount amounts may be stored locally at a third party network database. The third party network computer 160 may then allow the user to finish placing the order for the item, at step 450 of FIG. 4. The third party network computer 160 may then send some or all the data on the purchase, including the discount code if one was provided, to the administration network computer 110, at step 460. Any or all these steps may also be facilitated by execution of different sets of program instructions that may include: third party network base program instructions and third party network administration program instructions.

A third party network computer 160 may execute administration program instructions to cause the third party network computer to connect to the administration network computer 110, send the data for the items to be purchased, receive a link from the administration network computer 110, store the link in a third party network database, and return to executing a set of base program instructions. The process may begin with the third party network computer 160 administration program instructions being initiated by the third party network base program instructions. The third party network 160 may connect to the administration network computer 110 and then the third party network computer 160 may send third party network database data to the administration network computer 110. Then the third party network computer 160 may store the link in the third party network third party database.

Operation of a third party network discount program instructions 180 may include extracting a link sent by the user device 140 and comparing it to data stored at the third party network third party database. This may result in the identification of a corresponding discount for a selected item. This process may include identifying whether a user entered a code or not, after which a discount is applied, and the order is processed.

The process of applying a discount may begin by extracting the link received from the user. Then the third party network computer 160 may compare data included in the extracted link to data stored at the third party network database. The third party network computer 160 may then extract a corresponding discount from the third party network third party database. Then the third party network computer 160 may apply the extracted discount to the user's order. The third party network computer 160 may then determine if the user entered a code. If it is determined that the user did not enter a code the third party network computer 160 sends the user data to the administration network computer 110 without a code. If it is determined that the user entered a code the third party network computer 160 sends the code and the user data to the administration network computer 110. Next the third party network computer 160 may process the user's order.

A third party network third party database may store information about the items that may be purchased. This the third party network database may include local media for the product or service, where this local media may refer to the various types of media, such as photos, videos, text, sounds, haptics, online product descriptions, etc. for enhanced marketing.

Table 5 illustrates data that may be stored at a third party database. This data may include information about the items enrolled in the MLM system as well as a link created by execution of the administration network vendor program instructions. The third party network database may cross-reference a product ID, a product description, an original cost of the item, a discount provided by the third party for the item, a cost of the product with the discount, a compensation plan decay rate which the third party enters, and a link received from the administration network computer. The third party network third party database may include the rates of exchange for product returns, marketing materials, airline sky miles, etc. Product returns may refer to a process in which a customer or consumer takes previously purchased product, merchandise, or goods back to the retailer, and in turn receive a refund in the original form of payment, exchange for another product (identical or different), or a store credit.

The information about the product or service which may be advertisements to the network, or as seen on TV sales. Advertisements to the network may refer to the advertisement provided to the MLM system from the third party offering a product, good or service. These as seen on TV sales may refer to a generic nameplate for products advertised on television in the United States for direct response mail-order through a toll-free telephone number. Marketing materials may refer to a means of marketing, advertising or promotional materials developed by or for license (or subject to licensee's approval) that promote the sale of the licensed product, including but not limited to, television, radio, and online advertising, point of sale materials (e.g., posters, counter-cards), packaging advertising, print media and all audio or video media. Airline sky miles may refer to a loyalty program offered by airlines and/or credit cards. Typically, consumers accumulate a set amount of miles based on how much is spent on a ticket or a credit card and are also known as frequent flyer miles or travel points.

TABLE 5

Third Party Database Data

| | |
|---|---|
| ID | 654123 |
| Item | Drill |
| Original Cost | $59.00 |
| Discount | 15% |
| Discount Cost | $50.15 |
| Compensation Decay Rate | 50% |
| Link | HDDrill654123 |

Table 5: Third Party Database Data

FIG. 5 illustrates steps 500 that may be performed by the administration network computer 110 following a set of online store program instructions 125. FIG. 5 may begin with step 510 wherein the administration network computer 110 polls the administration database 130 for new products. When a new product is found, the administration network computer 110 may create, at step 520, a webpage for the new product in the online store website 195. The new webpage may be populated with details and pictures of the product if they are available. The new webpage may be created with scripts and html code that allow the product to be purchased. The new webpage may be inactive until activated by an administrator or another module. The administration network computer 110 may store, at step 530, the URL for the newly created webpage and the associated product ID in an online store database. Purchase of products from the online store may further be facilitated by a set of e-shopping cart program instructions.

Table 6 illustrates data that may be stored at an online store database. The online store database may contain product IDs of products that can be sold through the online store website 195 and a URL which may link to an individual web page within the online store website 195. The online store database may also include descriptions, pictures, reviews, shipping options, or any other data that might be useful in building a product page for the item. The online store database may also store metrics that determine when a product should be removed from the online store, for example, total sales, sales rate, time on market, user rating, etc.

TABLE 6

Online Store Database Data

| Product ID | Page URL |
|---|---|
| 654123 | https://www.kwikemart.com/654123 |
| 789654 | https://www.kwikemart.com/789654 |
| 123789 | https://www.kwikemart.com/123789 |
| 456812 | https://www.kwikemart.com/456812 |

Table 6: Online Store Database Data

A set of e-shopping cart program instructions may work as follows. The process may begin with the online store website 195 initiating the e-shopping cart program instructions via a button that a visitor to the website can interact with, for example, a "buy now" or "add to shopping cart" button on the product page. The administration network computer 110 then may extract the product ID received from the product page which is coded into the page. The product ID may be dynamically retrieved from a database when the page is being accessed by a web browser. The e-shopping cart program instructions may use the page URL to get the product ID from the online store database. The administration network computer 110 may compare the extracted product ID to the administration database 130. The administration network 110 may extract the corresponding discount from the administration database 130.

The administration network computer 110 may then determine if the user used a code. If the user was directed to the online store website 195 via a hyperlink with an embedded code, then the code is automatically entered for the user, otherwise the user must enter a code manually to get a discount. If it is determined that the user used a code the administration network computer 110 may use the code in executing the commission program instructions. Even though the code is associated with one product, the online store website may allow the purchase of multiple products in one transaction. The commission program instructions may be configured to give commission for products purchased in the same transaction as the product associated with the code. Then the administration network computer 110 may apply the extracted discount to the user's order.

The user may be able to use the code for a different product ID, for example, if the user was directed to the site via a hyperlink, and then while browsing the online store website 195 decided to buy a different product then the one they were originally referred. The user may still be eligible for a discount and the referrer may still receive a commission. A referring user may receive a commission simply by referring a buyer to the online store website 195 for the first time. If it is determined that the user did not enter a code the administration network computer 110 may create a new code so that the user can refer others and may create a new user ID. If the user already has a user ID and the user ID is known then that ID will be used with the new code instead of a new user ID. The user ID may be known if the user is, for example, logged in, using a browser extension with their information, or using the same device as a previous session and the device's IP address or MAC address is known, or the user's browser has downloaded a cookie that has the user ID. The user may be able to retroactively change a newly generated user ID to match an existing user ID, in another embodiment the user ID may be associated with user's credit card information, which may be a 3rd party credit card or a credit card linked to a credit card system within the system, which may also provide other useful data metrics about consumers and may be used as another means of tracking referrals by requiring the use of an in-network credit card to receive a discount.

Then the administration network computer may process the user's order. The data for the user's order is stored in a database which the user may add or remove products until the user is ready to make a purchase. The user may sign up for automatic purchase of product consumables. For example, if the user wants to receive toilet paper every month, the administration network computer 110 may prompt the user for this option at checkout and would store the automatic purchased product's product ID in a database which may then be polled periodically by another module. When the automatic purchase term has renewed the e-shopping cart program instructions may be initiated by that other module without user input.

Figure 6:
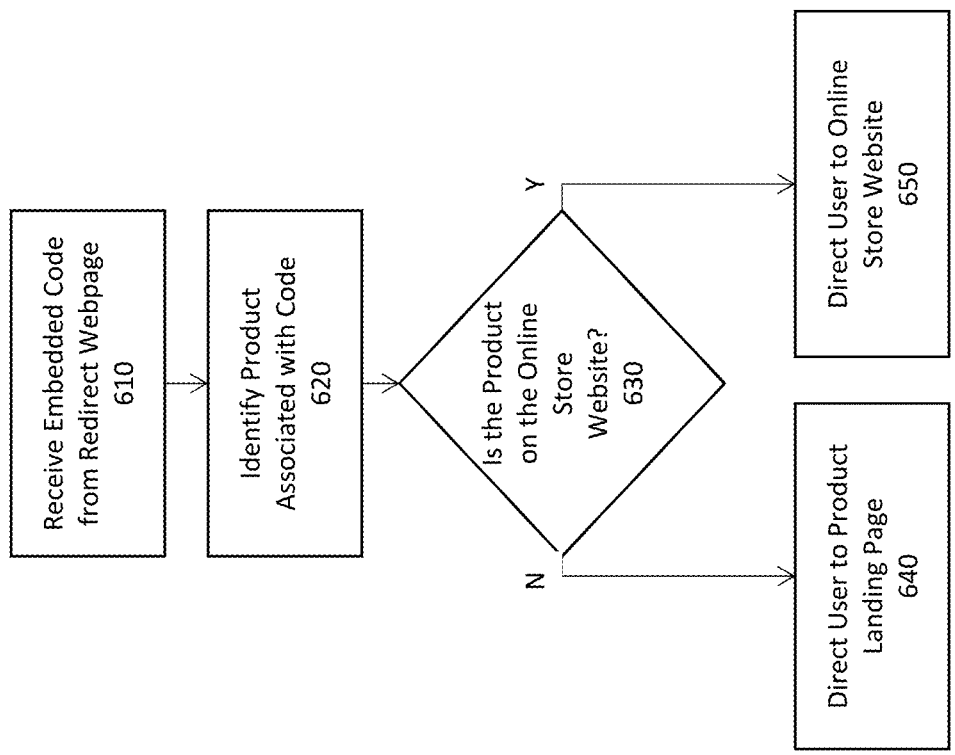
FIG. 6 illustrates a method that may be performed by the administration network computer 110 executing the set of redirect program instructions 125 of FIG. 1.

FIG. 6 illustrates steps 600 that may be performed by the administration network computer 110 following a set of redirect program instructions 125. FIG. 6 may begin with step 610 wherein the administration network computer 110 receives a code from a redirect webpage. The redirect webpage may be any webpage that can send data to or receive instructions from the administration network computer 110. The code may be embedded in the hyperlink that contains the URL of the redirect page. The administration network computer 110 may identify, at step 620, the product associated with the received code. This data may be stored in a database such as the code database. The administration network computer 110 may determine, at step 630, if the product is being sold through the online store website 195. This may involve checking the online store database to see if the product ID is present. If the product is being sold through the online store website 195, the administration network computer 110 may extract, at step 640, the product page URL from the online store database and redirect a web browser from the redirect page to the product page on the online store website 195. If the product is not being sold through the online store website 195, the administration network computer 110 may extract, at step 650, the landing page URL from a landing page database and redirect the web browser from the redirect page to the landing page for the product. The landing page may be provided by the vendor of the product.

Table 7 illustrates data that may be stored at a landing page database. The landing page database may contain product IDs and a URL link to the associated landing page, most likely the webpage where the product can be purchased. This information may be provided by the third party. The product IDs may identify a product. Multiple products may be combined into one campaign and the database may contain a campaign ID.

TABLE 6

Landing Page Database Data

| Product ID | Item Name | 3rd Party | Landing Page URL |
|---|---|---|---|
| 654123 | Drill | Home Depot | https://www.homedepot.com/... |
| 789654 | Table Saw | Home Depot | https://www.homedepot.com/... |
| 123789 | Couch | Furniture Store | https://www.bobsfurniture.com/... |
| 456812 | Cold Medicine | Pharmacy | https://www.vons.com/... |

Table 6: Landing Page Database Data

FIG. 7 illustrates a computing system that may be used to implement an embodiment of the present invention. The computing system 700 of FIG. 7 includes one or more processors 710 and main memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 770, user input devices 760, a graphics display 770, peripheral devices 780, and network interface 795.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH memory, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 770. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

Network interface 795 may include any form of computer interface of a computer, whether that be a wired network or a wireless interface. As such, network interface 795 may be an Ethernet network interface, a BlueTooth™ wireless interface, an 802.11 interface, or a cellular phone interface.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory/disk, a hard disk, magnetic tape, any other magnetic medium, a CD-ROM disk, digital video disk (DVD), any other optical medium, RAM, PROM, EPROM, a FLASH EPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The functions performed in the processes and methods which may be implemented in differing order. Furthermore, the outlined steps and operations are only provided as examples, and some of the steps and operations which may be optional, combined into fewer steps and operations, or expanded into additional steps and operations without detracting from the essence of the disclosed embodiments.

What is claimed is:

1. A method for distributing products, the method comprising:

generating a webpage on a website associated with initiating a purchase of a product;

receiving a request from a web browser to access a redirect webpage, wherein the request corresponds to a first hyperlink having an embedded first follower code associated with the product;

detecting that the webpage on the website associated with the product is not available;

directing the web browser to a landing page associated with the product that is associated with the embedded first follower code, wherein the landing page is provided by a vendor of the product;

receiving information at a computer that identifies a recipient of the product, a first product purchase confirmation, and the first follower code embedded in the first hyperlink, wherein the first follower code, the product, and a first user are associated with a commission schedule, and wherein the recipient is a second user;

distributing a first set of commissions for receipt by the first user according to the commission schedule associated with the first follower code embedded in the first hyperlink, the first set of commissions distributed following both receipt of first product purchase confirmation and receipt of the purchased product by the recipient;

associating a second follower code with the second user, the product, and the commission schedule, wherein the second follower code is generated at the computer based on information associated with the first user and embedded in the first hyperlink;

receiving a second purchase confirmation that identifies the second follower code embedded in the first hyperlink;

distributing a second set of commissions for receipt by the first user and the second user according to the commission schedule, the second set of commissions distributed following both receipt of the second purchase confirmation and receipt of the product by a third user;

storing data that identifies that the second user is a follower of the first user for sales of the product promoted by the second user in accordance with the first follower code embedded in the first hyperlink, wherein the second set of commissions distributed for receipt by the first user is based on the second user being the follower of the first user for sales of the product promoted by the second user and the receipt of the second purchase confirmation;

receiving a third purchase confirmation associated with a sale of a second product to the first user after a computing device of the first user received materials including a second hyperlink having embedded the second follower code associated with the second user that promote the sale the second product;

storing data that identifies that the first user is a follower of the second user for sales of the second product promoted by the first user in accordance with the second follower code embedded in the second hyperlink; and distributing a third set of commissions for receipt by the second user based on the third purchase confirmation being associated with the sale of the second product to the first user and based on the first user being the follower of the second user for the sale of the second product to the first user.

2. The method of claim 1, wherein the second purchase confirmation is received from the website.

3. The method of claim 1, further comprising directing the web browser to the redirect webpage.

4. The method of claim 1, wherein the first set of commissions includes commission for a second product not associated with the first follower code and which is purchased in a same transaction as the product.

5. The method of claim 4, wherein the purchase of both the product and second product are initiated through the website.

6. The method of claim 4, wherein the purchase confirmation of the second product does not identify a follower code associated with the second product.

7. The method of claim 4, further comprising applying a discount to the second product.

8. The method of claim 1, wherein the first set of commissions includes commission for a second product not associated with the first follower code and which is purchased by the second user after purchase of the product.

9. The method of claim 1, wherein the first set of commissions include commission for any product purchased after the second user is directed to the website via the first hyperlink containing the first follower code.

10. A non-transitory computer readable storage medium having embodied thereon a program executable by a processor to perform a method for distributing products, the method comprising:

generating at a computer a webpage on a website associated with initiating a purchase of a product;

receiving a request from a web browser to access a redirect webpage, wherein the request corresponds to a first hyperlink having an embedded first follower code associated with the product;

detecting that the webpage on the website associated with the product is not available;

directing the web browser to a landing page associated with the product that is associated with the embedded first follower code, wherein the landing page is provided by a vendor of the product;

receiving information at the computer that identifies a recipient of the product, a first product purchase confirmation, and the first follower code embedded in the first hyperlink, wherein the first follower code, the product, and a first user are associated with a commission schedule, and wherein the recipient is a second user;

distributing a first set of commissions for receipt by the first user according to the commission schedule associated with the first follower code embedded in the first hyperlink, the first set of commissions distributed following both receipt of the first product purchase confirmation and receipt of the purchased product by the recipient;

associating a second follower code with the second user, the product, and the commission schedule, wherein the second follower code is generated at the computer based on information associated with the first user and embedded in the first hyperlink;

receiving a second purchase confirmation that identifies the second follower code embedded in the first hyperlink;

distributing a second set of commissions for receipt by the first user and the second user according to the commission schedule, the second set of commissions distributed following both receipt of the second purchase confirmation and receipt of the product by a third user;

storing data that identifies that the second user is a follower of the first user for sales of the product promoted by the second user in accordance with the first follower code embedded in the first hyperlink, wherein the second set of commissions distributed for receipt by the first user is based on the second user being the follower of the first user for sales of the product promoted by the second user and the receipt of the second purchase confirmation;

receiving a third purchase confirmation associated with a sale of a second product to the first user after a computing device of the first user received materials including a second hyperlink having embedded the second follower code associated with the second user that promote the sale the second product;

storing data that identifies that the first user is a follower of the second user for sales of the second product promoted by the first user in accordance with the second follower code embedded in the second hyperlink; and distributing a third set of commissions for receipt by the second user based on the third purchase confirmation being associated with the sale of the second product to the first user and based on the first user being the follower of the second user for the sale of the second product to the first user.

11. The non-transitory computer readable storage medium of claim 10, wherein the second purchase confirmation is received at the computer from the website.

12. The non-transitory computer readable storage medium of claim 10, further comprising instructions executable to direct the web browser to the redirect webpage.

13. The non-transitory computer readable storage medium of claim 10, wherein the first set of commissions includes commission for a second product not associated with the first follower code and which is purchased in a same transaction as the product.

14. The non-transitory computer readable storage medium of claim 13, wherein the purchase of both the product and second product are initiated through the website.

15. The non-transitory computer readable storage medium of claim 13, wherein the purchase confirmation of the second product does not identify a follower code associated with the second product.

16. The non-transitory computer readable storage medium of claim 13, further comprising instructions executable to apply a discount to the second product.

17. The method of claim 10, wherein the first set of commissions includes commission for a second product not associated with the first follower code and which is purchased by the second user after purchase of the product.

18. The non-transitory computer readable storage medium of claim 10, wherein the first set of commissions include commission for any product purchased after the second user is directed to the website via the first hyperlink containing the first follower code.

* * * * *